(12) United States Patent
Riley et al.

(10) Patent No.: US 8,725,716 B1
(45) Date of Patent: May 13, 2014

(54) CUSTOMIZED WEB SUMMARIES AND ALERTS BASED ON CUSTOM SEARCH ENGINES

(75) Inventors: Patrick F. Riley, Palo Alto, CA (US); Ramanathan V. Guha, Los Altos, CA (US)

(73) Assignee: Google Inc., Mountain View, CA (US)

( * ) Notice: Subject to any disclaimer, the term of this patent is extended or adjusted under 35 U.S.C. 154(b) by 1058 days.

(21) Appl. No.: 12/130,864

(22) Filed: May 30, 2008

(51) Int. Cl.
*G06F 17/30* (2006.01)
*G06F 7/00* (2006.01)

(52) U.S. Cl.
USPC ............ 707/707; 707/721; 707/751; 707/768; 707/722

(58) Field of Classification Search
CPC .................. G06F 17/30864; G06F 11/008
USPC .................. 707/707, 721, 751, 768, 722
See application file for complete search history.

(56) References Cited

U.S. PATENT DOCUMENTS

| | | | |
|---|---|---|---|
| 6,314,420 B1 * | 11/2001 | Lang et al. | 707/999.002 |
| 6,327,590 B1 * | 12/2001 | Chidlovskii et al. | 707/734 |
| 6,493,702 B1 * | 12/2002 | Adar et al. | 707/706 |
| 6,565,608 B1 * | 5/2003 | Fein et al. | 715/255 |
| 6,594,654 B1 * | 7/2003 | Salam et al. | 707/999.003 |
| 6,631,367 B2 * | 10/2003 | Teng et al. | 707/999.004 |
| 6,681,369 B2 * | 1/2004 | Meunier et al. | 715/255 |
| 6,766,315 B1 * | 7/2004 | Bratsos et al. | 707/999.003 |
| 6,816,878 B1 * | 11/2004 | Zimmers et al. | 709/200 |
| 6,820,076 B2 * | 11/2004 | Bailey et al. | 707/770 |
| 6,842,774 B1 * | 1/2005 | Piccioni | 709/207 |
| 7,159,011 B1 * | 1/2007 | Knight et al. | 709/207 |
| 7,162,471 B1 * | 1/2007 | Knight et al. | 707/750 |
| 7,250,846 B2 * | 7/2007 | Ebling et al. | 340/7.28 |
| 7,680,927 B2 * | 3/2010 | McMullen et al. | 709/224 |
| 2003/0212673 A1 * | 11/2003 | Kadayam et al. | 707/3 |
| 2004/0246120 A1 * | 12/2004 | Benner et al. | 340/506 |
| 2007/0179792 A1 * | 8/2007 | Kramer | 705/1 |
| 2008/0177706 A1 * | 7/2008 | Yuen | 707/3 |

* cited by examiner

*Primary Examiner* — Pavan Mamillapalli
(74) *Attorney, Agent, or Firm* — Fish & Richardson P.C.

(57) ABSTRACT

The present invention provides systems and methods for generating alerts based on results received from one or more custom search engines. In an embodiment, the present invention generates alerts based on custom search engines by (1) receiving one or more alert specifications including a custom search engine identifier; (2) receiving at least one current result from the identified custom search engines; (3) determining one or more itemized alert elements based on the at least one current result; and (4) transmitting a signal representing the one or more itemized alert elements to a user via a communication network.

19 Claims, 8 Drawing Sheets

| CSE ID: | A |
|---|---|
| Query: | Patent |
| Alert Type: | Everyday 01:00PM PST |
| | Individual |
| | Ranking – Top 5 only |

704a → CSE ID (704b=A)
706a → Query (706b=Patent)
708a → Alert Type (708b=Everyday 01:00PM PST, 708c=Individual, 708d=Ranking – Top 5 only)

| Previous Results | 9/17/07 01:00PM PST |
|---|---|
| 1. | C |
| 2. | D |
| 3. | E |
| 4. | F |
| 5. | G |
| 6. | H |
| 7. | I |

710, 712, 714, 716, 718, 720, 722, 724

| Current Results | 9/18/07 01:00PM PST |
|---|---|
| 1. | C |
| 2. | D |
| 3. | E |
| 4. | F |
| 5. | G |
| 6. | J |
| 7. | I |
| 8. | K |
| 9. | H |

730a, 712, 714, 716, 718, 720, 726, 724, 728, 722

750a — Custom Alert: {null set}

FIG. 7A

| CSE ID: | A |
|---|---|
| Query: | Patent |
| Alert Type: | Everyday 01:00PM PST |
| | Individual |
| | Ranking – Top 5 only |

704a → 704b
706a → 706b
708a → 708b, 708c, 708d

| Previous Results 9/18/07 01:00PM PST |
|---|
| 1. – C |
| 2. – D |
| 3. – E |
| 4. – F |
| 5. – G |
| 6. – J |
| 7. – I |
| 8. – K |
| 9. – H |

730b
712, 714, 716, 718, 720, 726, 724, 728, 722

| Current Results 9/19/07 01:00PM PST |
|---|
| 1. – C |
| 2. – J |
| 3. – G |
| 4. – D |
| 5. – F |
| 6. – E |
| 7. – I |
| 8. – K |
| 9. – H |

770
712, 726, 720, 714, 718, 716, 724, 728, 722

| Custom Alert: | |
|---|---|
| New Additions to Top 5 | J to 2 |
| Dropped from Top 5 | E was 3 |
| Rank Increased in Top 5 | G, 5 to 3 |
| Rank Decreased in Top 5 | D, 2 to 4 <br> F, 4 to 5 |

CUSTOMIZED WEB SUMMARIES AND ALERTS BASED ON CUSTOM SEARCH ENGINES

FIELD OF THE INVENTION

The present invention relates to search engines. More particularly, it relates to alerts and custom search engines.

BACKGROUND OF THE INVENTION

Users can find information they are looking for through different search engines available over the Internet. Unfortunately, searching can be tedious and time consuming, and it requires users to initiate a search to pull data. Because of this, various databases, search engines, and websites provide a feature where users can request alerts when new information is generated. For example, alerts can occur when a database receives new entries, when a chosen query provides new results in the search engine, or when a website posts new content. In this way, information meeting an alert definition is pushed to the user.

In the case of websites, current alert setup options allow a user to define what type of alert content he or she would like to receive by selecting from a list of categories or settings that define conditions for the triggering of the alert or define content of the alert. While the current alert setup has advantages in certain situations, there are also limitations. The user is restricted to the particular site providing the alert and to what the content provider feels are appropriate categories. Alerts for search engines may cover wider search areas and produce alerts with results from around the web or other corpora of information. However, the user has limited control over the source of the content received and can be inundated with irrelevant information that masks the desired content.

Further, conventional alerts that are predefined by a user are static. Even if an alert definition is initially defined well by a user, over time the alert definition may become less effective and miss important new areas of interest not appreciated or known to the user at the time the alert was created.

What is needed is an alert service that presents relevant and useful information, without the content restrictions imposed by current alert setups.

BRIEF SUMMARY

This invention relates to alerts and custom search engines. A system embodiment of this invention leverages the use of custom search engines to allow users to create customized alerts. Custom search engines offer a more refined search than standard search engines, as they modify the scope of the search by including or excluding websites or web pages when executing the query. Some custom search engines may also offer a ranking option, giving higher priority to some sites or pages.

A system embodiment includes an alert generator, to query one or more custom search engines, and one or more custom search engines, to send results back to the alert generator. The alert generator receives results from the one or more custom search engines to determine an alert.

A method embodiment of this invention leverages the use of custom search engines to allow users to create customized alerts. The method embodiment includes an alert generator receiving one or more alert specifications. The alert generator also receives one or more results from one or more custom search engines. The alert generator then determines one or more itemized alert elements based on the one or more results received from the one or more custom search engines. Finally, the one or more itemized alert elements are transmitted to the user via a communications network.

Individual alerts are specific to a custom search engine, providing an ability to receive very targeted results. These individual alerts notify users when results produced by their custom search engine have changed, whether it be because new results have been found or because the custom search engine specifications have been modified.

Community alerts vary from individual alerts in that community alerts take all custom search engines into account. Community alerts paint a broad picture of the type of results all custom search engines are producing, and which of those results is most prevalent. These alerts give a current snapshot as to what results other users in the community have deemed important and provide insight into how other custom search engines have been tuned.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIGS. 7A and 7B are example individual alert generation cases, according to an embodiment of the present invention.

DETAILED DESCRIPTION OF EMBODIMENTS

The present invention relates to generating alerts based on at least the results of one or more custom search engines. In an embodiment, an alert is any notification a user receives indicating that new or different information is available. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for generating alerts based on custom search engines in greater detail.

System

Figure 1:
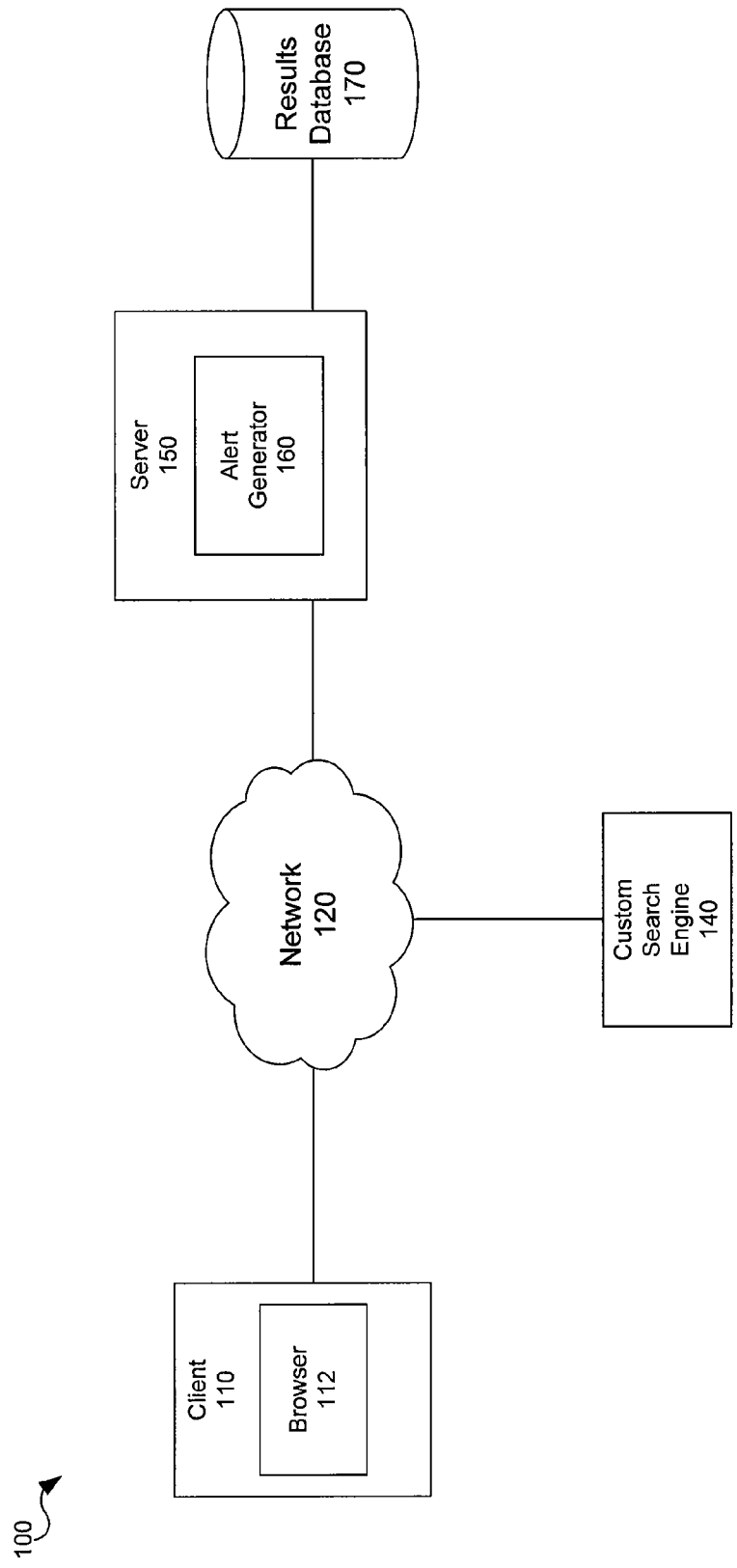
FIG. 1 is an architecture diagram of a system for generating alerts based on custom search engines, according to an embodiment of the present invention.

This section describes a system suitable for generating individual and community alerts. FIG. 1 is an architecture diagram of a system for generating alerts based on custom search engines according to an embodiment of the present invention. FIG. 1 shows system 100. System 100 includes a client 110, a custom search engine (CSE) 140, a server 150, and a results database 170, connected by one or more networks 120. Although there is only one client 110 shown, there may be many clients in system 100.

Each of client 110, custom search engine 140, server 150, and results database 170 may be implemented on a computing device. Such a computing device can include, but is not limited to, a personal computer, mobile device such as a mobile phone, workstation, embedded system, game console, television, or set-top box. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display.

Client 110, custom search engine 140, server 150, and results database 170 may be implemented on one or more computing devices at the same or at different locations. For instance, client 110, custom search engine 140, server 150, and results database 170 may be remote from one another on different computing devices coupled to a network, such as network 120. In still another example, custom search engine 140, server 150 and results database 170 may be implemented on one or more computing devices at a common location and coupled to a remote client 110 over network 120. Other combinations and configuration for arranging client 110, custom search engine 140, server 150, and results database 170 may be used as would be apparent to a person skilled in the art given this description.

Network 120 may be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

Client 110 includes a browser 112. For example, browser 112 may be a web browser or other type of browser for browsing content. Browser 112 can send a request over network 120 to server 150 and receive a response from server 150. As an example, not to limit the present invention, the request may be a hypertext transfer protocol (HTTP) request. The HTTP request may contain parameters entered by a user using a user interface. The response may be an HTTP response. An HTTP response may contain web content, such as a hypertext markup language (HTML), images, video, or multimedia content.

Server 150 may include a web server or may be coupled to communicate with a web server at the same or a different location. A web server is a software component that responds to an HTTP request with an HTTP response. As illustrative examples, the web server may be, without limitation, an Apache HTTP Server, Apache Tomcat, Microsoft Internet Information Server, JBoss Application Server, WebLogic Application Server, or Sun Java System Web Server. The web server may contain web applications which generate content in response to an HTTP request. The web server may package the generated content and serve the content to a client in the form of an HTTP response. Such content may include HTML, extensible markup language (XML), documents, videos, images, multimedia features, or any combination thereof. This example is strictly illustrative and does not limit the present invention.

According to an embodiment, server 150 includes alert generator 160. A user predefines an alert, and an alert specification is stored. Then, automatically or at the request of the user, alert generator 160 initiates a search based on the alert specification. If the search results meet the criteria set in the alert specification, then alert generator 160 sends an alert back to the user.

Custom search engine 140 is a user-defined search engine that produces results based on a search specification and a search query. Search specifications may include, but are not limited to, elements that indicate how certain terms or keywords are to be included, excluded, favored, or disfavored, one or more parameters to restrict, to promote, to demote or to remove results, and elements to indicate what websites (e.g. URLs) are to be included, excluded, favored, or disfavored in a search.

In an embodiment, custom search engine 140 customizes a query of a plurality of underlying search engines. Based on the search specification and search query, custom search engine 140 generates and outputs a modified query to the plurality of underlying search engines (not shown). Custom search engine 140 then receives ordered results from a search performed on the plurality of underlying search engines according to the modified query. Finally, custom search engine 140 generates combined or modified results from the ordered results based on the search specification to fulfill the search query. In general, modified results from custom search engine 140 can include any results returned from custom search engine 140, including but not limited to, results returned from custom search engine 140 based on a modified query input to the plurality of underlying search engines, and/or further modification of ordered results returned by the plurality of underlying search engines based on the original query or a modified query.

In this way, a user can create a search engine tailored to specific interests. In one embodiment, custom search engine 140 is any custom search engine or collection of custom search engines defined by a user. In a second embodiment, custom search engine 140 is specific to the user. In a third embodiment, custom search engine 140 is specific to a group of users who may have control over the search specification. While FIG. 1 depicts one custom search engine 140, it is possible that more than one custom search engine 140 may be present.

Alert generator 160 extracts a custom search engine identifier from the alert specification. Automatically, or at the request of the user, alert generator 160 sends a search query to custom search engine 140 identified by the custom search engine identifier to initiate the search. Custom search engine 140 returns its combined or modified results to alert generator 160, such that alert generator 160 can then complete its alert generation process.

Results database 170 contains one or more results from a previous search command made to custom search engine 140. Each time a query is made to custom search engine 140, results database 170 captures and stores those results.

Each of browser 112 and alert generator 160 may be implemented as software, hardware, firmware, or any combination thereof.

Figure 2:
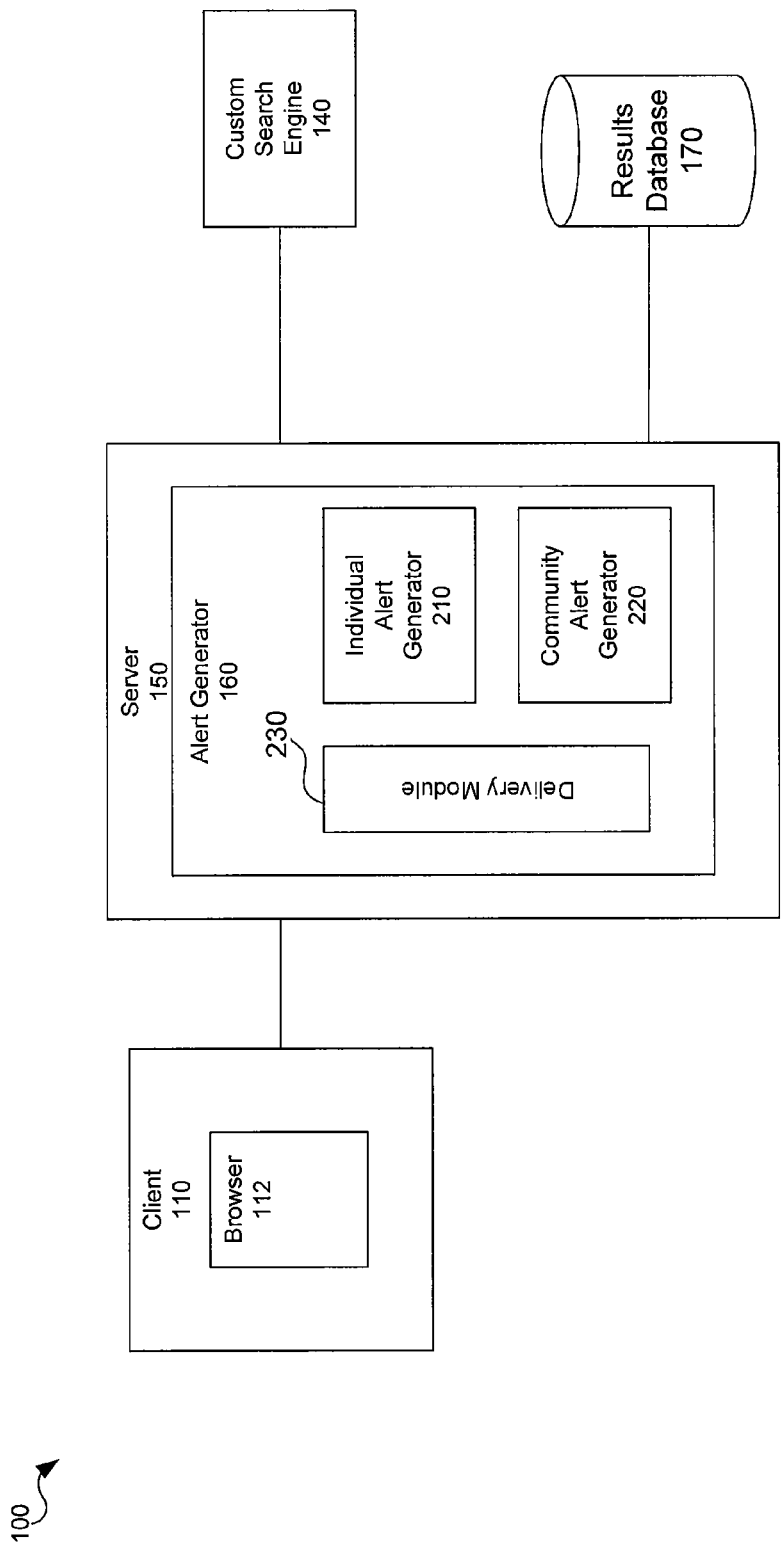
FIG. 2 is a more detailed diagram of the components of the system in FIG. 1, according to an embodiment of the present invention.

FIG. 2 is a more detailed diagram of the components of system 100 in FIG. 1, according to an embodiment of the present invention. As shown in FIG. 2, client 110 may communicate with server 150, and server 150 may communicate with custom search engine 140 and results database 170. As discussed previously, this communication may take place over one or more networks 120, such as the Internet.

Alert generator 160 includes an individual alert generator 210, a community alert generator 220 and a delivery module 230. Individual alert generator 210 generates alerts based on queries to custom search engine 140. In this way, each user subscribed to an individual alert can be notified when results produced by their custom search engine 140 have changed, whether it be because new results have been found or because the specifications governing custom search engine 140 have been modified. How alerts are generated is described in greater detail below. In one embodiment, individual alert generator 210 generates alerts for one user. In a second embodiment, individual alert generator 210 generates alerts for a group of users.

Community alert generator 220 generates alerts based on a plurality of queries to a plurality of custom search engines 140. In this way, each user subscribed to a community alert can get a broad picture of the type of results all custom search engines 140 are producing, and which of those results is most prevalent. A community alert may also provide a current snapshot as to what results other users in the community have deemed important and provide insight into how other custom search engines 140 have been tuned. In one embodiment, community alert generator 220 generates alerts for a group of users, each of whom holds control over different custom search engines 140 being queried. In a second embodiment, community alert generator 220 generates alerts for a group of users, all of whom hold control over a single custom search engine 140 being queried. In a third embodiment, community alert generator 220 generates alerts for a group of users, none of whom hold control over a custom search engine 140, yet are accessible via a user account, such as, for example, a Google Account.

Delivery module 230 controls the transmission of alerts to the user. In one embodiment, delivery module 230 may determine the frequency of transmission, the method of transmission, or the type of alert to be transmitted.

Individual alert generation and community alert generation is discussed further below with respect to FIGS. 3-7.

Each of individual alert generator 210, community alert generator 220, and delivery module 230 may be implemented as software, hardware, firmware, or any combination thereof.

Figure 3:
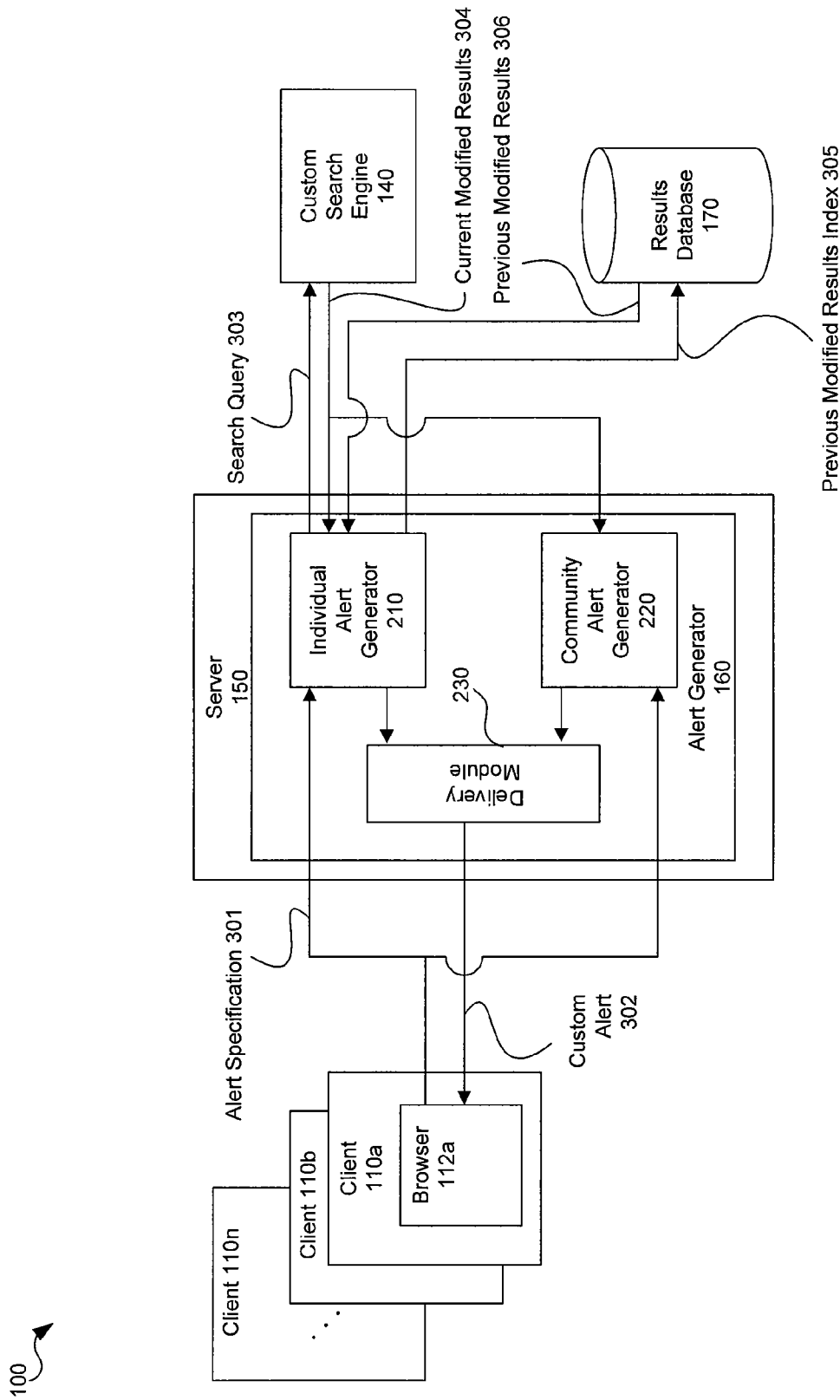
FIG. 3 is a diagram that displays how components of the system in FIG. 1 may interoperate, according to an embodiment of the present invention.

FIG. 3 is a diagram that displays how components of system 100 in FIG. 1 may interoperate, according to an embodiment of the present invention. Although not shown in FIG. 3, each client 110a-n includes its respective browser 112a-n. In an embodiment, one browser 112a-n may send an alert specification 301 to server 150. In an alternate embodiment, not shown, all browsers 112a-n may send an alert specification 301 to server 150. As an example, alert specification 301 may be HTTP parameters generated by one browser 112a-n using an HTML form. In an example, an HTML form may be displayed by a user interface to a user. The user enters data representing feature and region information into an HTML form using a user interface. The user then presses a submit button on the HTML form. This triggers one browser 112a-n to generate an HTTP request that includes alert specification 301 as HTTP parameters. This example is merely illustrative and is not intended to limit the present invention.

Alert specification 301 defines how individual alert generator 210 and community alert generator 220 generate alerts using custom search engine 140 and results database 170. In an example, alert specification 301 may include, but is not limited to, a search query, a custom search engine identifier, an alert type, and a previous modified results index.

The search query of alert specification 301 includes, but is not limited to, words or phrases for which a user or group of users wishes to receive alerts.

The custom search engine identifier of alert specification 301 provides information that points to the desired custom search engine 140.

The alert type of alert specification 301 identifies whether an individual alert, a community alert, or both should be generated. The alert type can also identify the conditions under which an alert should be generated and how often. Later sections describe in more detail these possible conditions.

The previous modified results index of alert specification 301 points to at least one element in results database 170 that is associated with the user and custom search engine 140. This allows individual alert generator 210 to receive results from previous queries to custom search engine 140. Alert specification 301 may be used by alert generator 160 in conjunction with custom search engine 140 to determine the proper alert to display.

Once server 150 receives alert specification 301, individual alert generator 210 may use alert specification 301 to generate a search query 303 and a previous modified results index 305.

Custom search engine 140 uses search query 303 to generate a current modified results 304 returned to individual alert generator 210 and community alert generator 220. As an example, current modified results 304 may be an HTTP request. In an embodiment, current modified results 304 may include an up-to-date ordered ranked list of results related to search query 303.

Results database 170 uses previous modified results index 305 to select a previous modified results 306. In an embodiment, previous modified results 306 may include a dated ordered ranked list of results related to search query 303.

Both individual alert generator 210 and community alert generator 220 receive and analyze current modified results 304. In an embodiment, only individual alert generator 210 analyzes previous modified results 306. In another embodiment, not shown, previous modified results 306 may be used by both individual alert generator 210 and community alert generator 220.

Delivery module 230 receives the results of the analysis completed by individual alert generator 210 and community alert generator 220 to produce custom alert 302. The analysis completed by each alert generator is discussed in more detail below.

One or more browsers 112a-n receive custom alert 302 to complete the process. In one embodiment, custom alert 302 includes alerts generated by individual alert generator 210. In a second embodiment, custom alert 302 includes alerts generated by community alert generator 220. In a third embodiment, custom alert 302 includes alerts generated by both individual alert generator 210 and community alert generator 220. As an example, custom alert 302 may be in the form of an email, instant message, HTML, or via other data or applications that may reside on one or several (e.g., a network) of computer systems.

Figure 4:
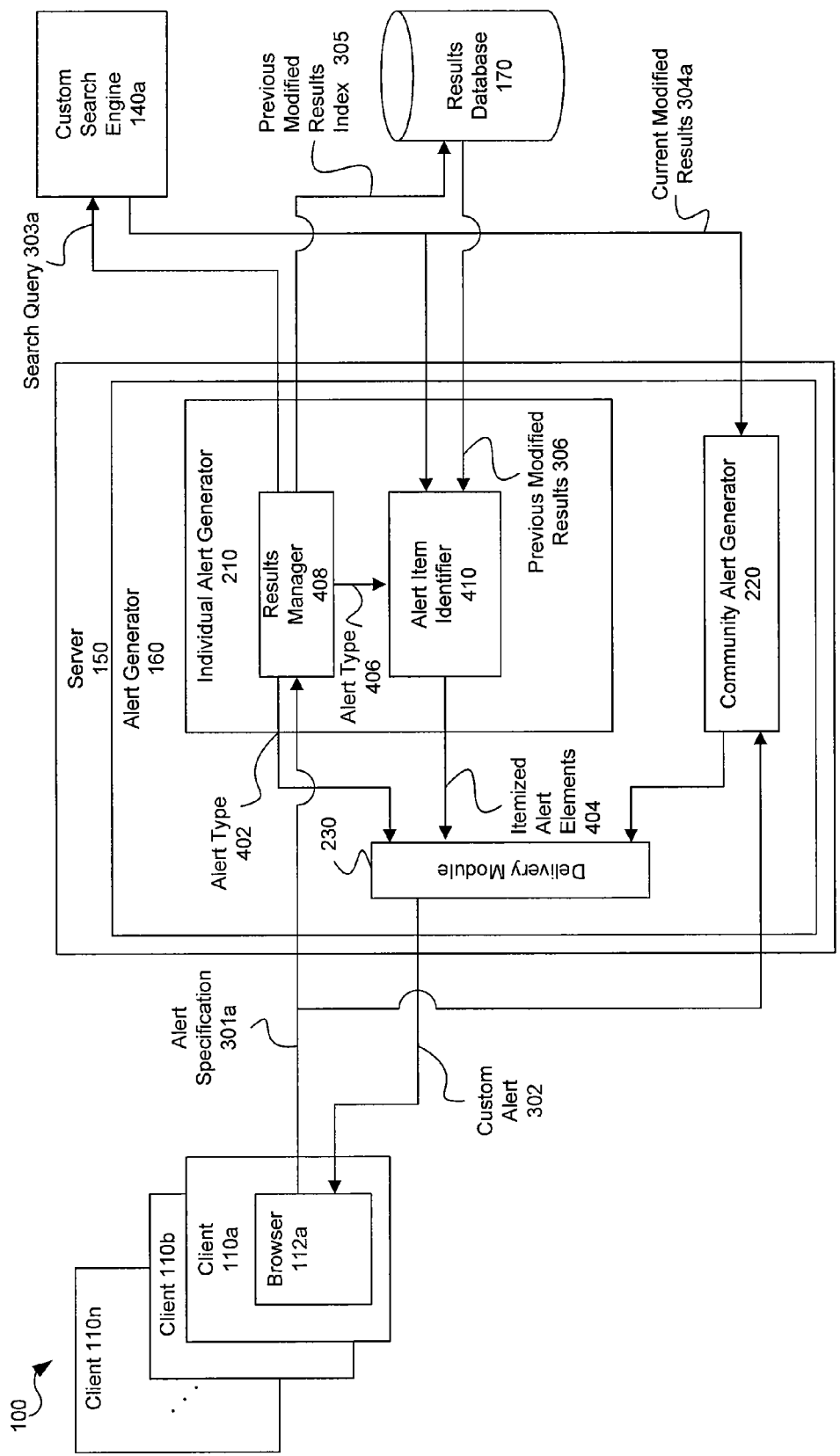
FIGS. 4-5 are more detailed diagrams of the system in FIG. 1, including how components of the system may interoperate, according to an embodiment of the present invention.

FIG. 4 is a more detailed diagram of system 100 in FIG. 1, including how components of system 100 may interoperate, according to an embodiment of the present invention. More specifically, FIG. 4 is a more detailed diagram of individual alert generator 210. As shown in FIG. 4, individual alert generator 210 includes at least two components: a results manager 408 and an alert item identifier 410. While individual alert generator 210 is described herein as including several separate components, the components may be combined, for example, so that the functionality of two components reside within a single component. Thus, the individual components shown in FIG. 4 are illustrative and not intended to limit the present invention.

Results manager 408 receives alert specification 301 from browser 112. In an embodiment, results manager 408 processes the information contained in alert specification 301 and sends commands to various components in order to facilitate the generation of an alert. In no particular order, results manager 408 sends a search query 303a to custom search engine 140a, a previous modified results index 305 to results database 170, an alert type 402 to delivery module 230 and an alert type 406 to alert item identifier 410. This may also be done in parallel. As mentioned above, in an embodiment, the delivery module 230 determines the frequency of transmission. It does so based on alert type 402, and alert type 406 holds the same information as alert type 402.

Alert item identifier 410 uses the information from the data it receives to determine and list possible alerts. In an embodiment, alert item identifier 410 receives an alert type 406 from results manager 408, current modified results 304a from custom search engine 140a, and previous modified results 306 from results database 170.

Alert type 406, received from results manager 408, defines the rules by which alert item identifier 410 assesses current and previous modified results 304a and 306. In an embodiment, these rules, defined by the user or a group of users, includes, but is not limited to, the desired frequency of alerts and the desired alert content.

The desired frequency of alerts can be static or dynamic. For example, a static alert may be dependent on time. In an embodiment, the user may request an alert once an hour, once a day, and so on, and set the appropriate run time. If any alert worthy result appears between the time intervals, then a custom alert 302 is generated when requested. In an embodiment, alert worthy results are defined by alert type 402 and 406. As an example, if the user sets the frequency to be once a day, and sets the appropriate run time to be 1:00 PM, then results manager 408 sends search query 303a to custom search engine 140a everyday at 1:00 PM in order to initiate the alert generation process. In another embodiment, the user may request an alert on specific days, or a one-time alert, and set the appropriate run time. A dynamic alert, for example, may be based on content. When a given query to a custom search engine produces one or more results that are deemed alert worthy, then the alert is immediately generated.

In one embodiment, the alert worthy results may include any new results generated by a given query to custom search engine 140a. If, for example, a previous query yields the results X, Y, and Z, and a current query yields results X, Y, Z, and A, then an alert is generated acknowledging the new result A. In a second embodiment, the alert worthy results may include any result that has moved up or down in priority, relative to the other results. If, for example, a previous query yields the results B, C, D, E, in that order, and a current query yields the results B, D, C, E, in that order, then an alert is generated indicating result D's ranking has improved and/or result C's ranking has worsened.

In a third embodiment, the alert worthy results may include any change in results that occur due to the changing of custom search engine 140a. Because many users may have control over the defining qualities of the custom search engine 140a, one user may make a change that affects the results. Other users may wish to be notified if the changes to the search engine cause subsequent changes in the results.

In all three cases, the user or group of users can fine tune the definition of an alert to meet their needs. By modifying custom search engine 140a, the user or group of users can limit the scope of their results. By adjusting the alert settings, the user or group of users can then control the content over which an alert is generated.

Once the proper alert content has been determined, the content is prepared for transmission. In one embodiment, the alert worthy results are organized in the same order as they appear in the search results. In a second embodiment, the alert worthy results are organized according to those results that saw a ranking increase and those results that saw a ranking decrease. In a third embodiment, the alert worthy results is organized in alphabetical order. In a fourth embodiment, the alert worthy results are organized via the time and date at which they first appeared. In a fifth embodiment, the alert worthy results are organized according to the topic each result falls under. The results include the relevant information as to why they are considered alert worthy results. The results are compiled into itemized alert elements 404 and sent to delivery module 230.

Figure 5:
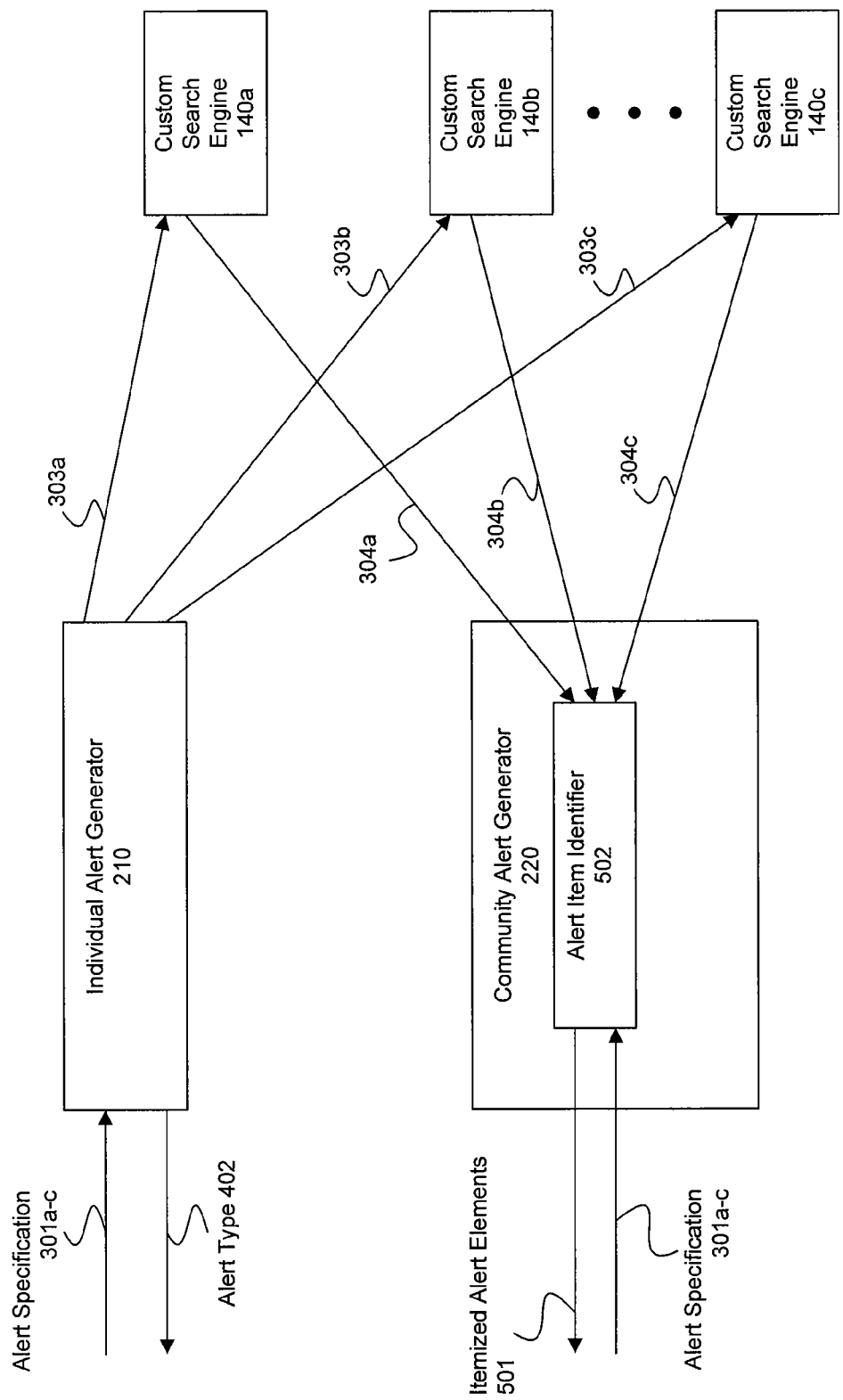

FIG. 5 is a more detailed diagram of system 100 in FIG. 1, including how components of system 100 may interoperate, according to an embodiment of the present invention. More specifically, FIG. 5 is a more detailed diagram of community alert generator 220. The purpose of community alert generator 220 is slightly different from that of individual alert generator 210 in that the former aims to get a feel for the types of results and popularity of results returned for all users of a custom search engine. As shown in FIG. 5, community alert generator 220 includes an alert item identifier 502. While the community alert generator 220 is described herein as including one component, the component may be separated, for example, so that the functionality of one component resides within two separate components. Thus, the individual component shown in FIG. 5 is illustrative and not intended to limit the present invention.

Alert item identifier 502 receives alert specifications 301a-c from browser 112, and current modified results 304a-c from custom search engines 140a-c. Each time a query is made to a custom search engine 140a-c, whether it be by individual alert generator 210 or by a user or group of users, custom search engines 140a-c will send current modified results 304a-c to community alert generator 220. FIG. 5 illustrates an individual alert generator 210 initiating search queries 303a-c to custom search engines 140a-c. Once the alert content has been determined, the results are organized into itemized alert elements 501 and sent out to delivery module 230.

Like the alert item identifier 410 of individual alert generator 210 as shown in FIG. 4, alert item identifier 502 helps capture alerts based on a set of rules. However, unlike alert item identifier 410 of the individual alert generator 210, alert item identifier 502 may not need to receive previous modified results 306. The alerts generated in community alert generator 220 may not be based on differences between old and new results, but may instead be based on an aggregation of results.

In one embodiment, alerts generated by community alert generator 220 are based on the number of occurrences of a given result after the query to custom search engines 140a-c. For example, if result X appears 100 times in queries to all custom search engines 140a-c, and if result A appears 20 times in queries to all custom search engines 140a-c, then X may be deemed more alert worthy than A.

In a second embodiment, this method may be taken a step further. Instead of basing the alert solely on the number of occurrences of a given result, the alert may be based on a combination of the number of occurrences of a given result and the number of different custom search engines 140a-c and different users that generate the given result. For example, using the example from above, if result X appears 100 times in queries made by two users or groups of users, this may be considered less significant than if result A appears 20 times in queries made by ten users, even though X occurs more often in total than A.

This embodiment may be useful if a user G queries their custom search engine at a higher frequency than other users. In this scenario, community alert generator 220 receives the modified query results of user G more often, likely seeing similar results each time. User G's constant queries artificially raise the calculated popularity of a result, when it may be that few other users see that result. Placing less weight on the absolute number of result occurrences helps lessen the effects of this possible skew.

In a third embodiment, not shown, an alert may be generated based on the change in results over all custom search engines 140a-c. This embodiment ties together the functionality of individual alert generator 210 with the functionality of community alert generator 220, as described above. Instead of custom search engine 140a-c sending its current modified results 304a-c to alert item identifier 502, custom search engines 140a-c will send their corresponding current modified results 304a-c to individual alert generator 210. Individual alert generator 210 determines alert worthy content for each current modified result 304a-c received, and sends its alerts, in the form of itemized alert elements 404, to alert item identifier 502.

Alert item identifier 502 aggregates all received itemized alert elements 404 and then counts the number of occurrences of each result. As in the first and second embodiment, this may or may not take into account the number of unique custom search engines 140a-c that generated each result. The third embodiment then produces an alert including the results most worthy of an individual alert, when all custom search engines 140a-c are taken as a whole.

As described in the embodiments above, community alerts allow a user to stay knowledgeable on what others deem important. Community alerts may also help to alleviate information deficiencies. If, for example, a user lacks time to properly keep up with what he or she finds interesting, or is unaware of what he or she might find interesting, the community alert can function to supplant information the user may otherwise be lacking. The community alert may inform the user of a new technology or of developments in a current event. The user can stay in-touch with the web even if other matters consume his or her time.

Method

Figure 6:
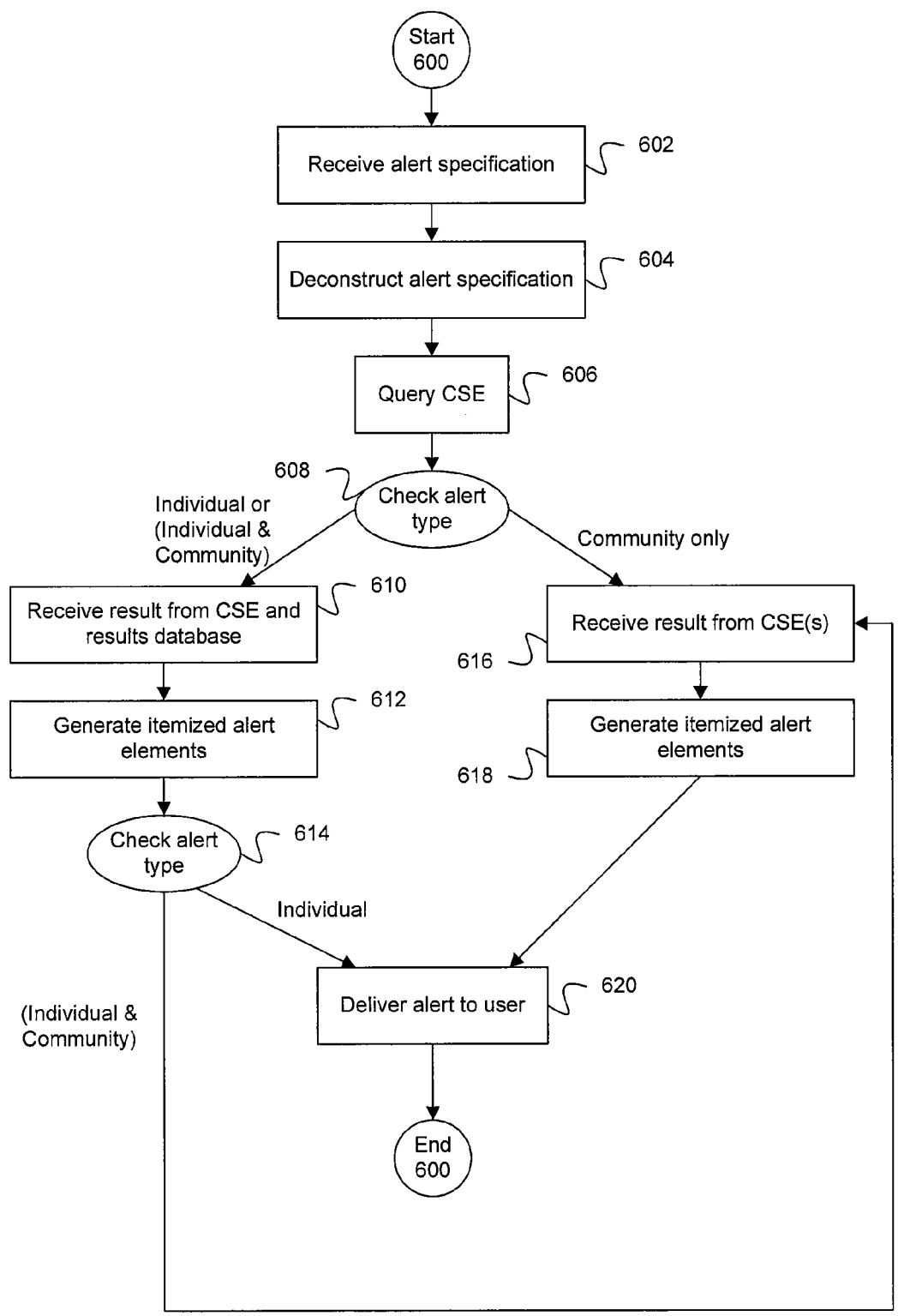
FIG. 6 is a flowchart of an alert generating process, according to an embodiment of the present invention.

This section describes a method used to achieve both alerts based on a custom search engine. FIG. 6 is a flowchart of an alert generating method 600 according to an embodiment of the present invention. In an example, method 600 may be used in operation of system 100 from FIGS. 1-5. However, method 600 is not meant to be limited to system 100. As shown in FIG. 6, method 600 begins at stage 602 with both individual alert generator 210 and community alert generator 220 receiving an alert specification 301 from FIG. 3 generated by a user through browser 112.

Once stage 602 is complete, method 600 can proceed to stage 604. In stage 604, results manager 408 deconstructs alert specification 301 in order to initiate the alert generation process. Deconstruction of alert specification 301 includes sending commands to alert item identifier 410, custom search engine 140, results database 170, and delivery module 230, as described above with respect to FIG. 4.

Method 600 proceeds to stage 606 once stage 604 is complete. Stage 606 includes results manager 408 sending a search query 303 to custom search engine 140 in order to generate a list of current modified results 304. Method 600 then proceeds to stage 608.

In stage 608, method 600 checks alert type 402 and 406 to see if an individual alert, community alert, or both are to be generated. If an individual alert or both alerts are to be generated, then method 600 proceeds to stage 610. If only a community alert is to be generated, then method 600 proceeds to stage 616.

Stage 610 includes alert item identifier 410 of individual alert generator 210 receiving current modified results 304 from custom search engine 140 previous modified results 306 from results database 170.

Once the results have been received, method 600 advances to stage 612 where itemized alert elements 404 are generated based on the results and alert type 406.

Method 600 then checks alert type 402 and 406 to determine if a community alert was also desired. If so, method 600 proceeds to stage 616. If not, method 600 continues to stage 620.

In stage 616, alert item identifier 502 of community alert generator 220 receives current modified results 304 from custom search engines 140. In an embodiment, not shown, stage 616 may be done iteratively, recursively, or in parallel with stage 610.

Once current modified results 304 have been received, method 600 proceeds to stage 618 where itemized alert elements 501 are generated based on current modified results 304 and alert specification 301. Process 600 can then continue on to stage 620.

In stage 620, delivery module 230 takes itemized alert elements 404 and/or 501 from individual alert generator 210 and/or community alert generator 220, and transmits custom alert 302 to the user via browser 112. Once stage 620 is completed, method 600 ends.

To give a better understanding of stages 608, 610, 612, 614 and 620, FIGS. 7A-B have been provided. FIGS. 7A-B are example individual alert generation cases according to an embodiment of the present invention. Both figures graphically explain stages 608, 610, 612, 614, and 620, each showing a different outcome. As shown in FIGS. 7A-B, listed are the elements included in alert specification 301, custom search engine identifier 704a, search query 706a, and alert type 708a, along with a set of previous results 710 and 730b, current results 730a and 770, and custom alerts 750a-b.

Focusing on FIG. 7A, custom search engine identifier 704a has been assigned to custom search engine A 704b. Search query 706a has been set to the query "Patent" 706b. Alert type 708a has defined the alert as occurring everyday at 1:00 PM PST 708b, as an individual alert 708c, and to be based on only the rankings of the top 5 results 708d.

Previous results 710 were initially run on Sep. 17, 2007 at 1:00 PM PST, and produced the results shown in FIG. 7A. Current results 730a were run on Sep. 18, 2007 at 1:00 PM PST and again produced the results shown in FIG. 7A. As can be seen, previous results 710 produce 7 total results, whereas current results 730a produce 9 total results. The first new result, J 726, is ranked sixth in current results 730a. The second new result, K 728, is ranked eighth in current results 730a. Result H 722 moved from sixth in previous results 710 to ninth in current results 730a. However, custom alert 750a is null because the rankings for the top five results did not change.

In FIG. 7B, current results 730a from FIG. 7A have now been placed in previous results 730b as another query has been run. The new current results 770 run on Sep. 19, 2007 at 1:00 PM PST show several differences from previous results 730b. Result D 714 has moved from second to fourth, result E 716 has moved from third to sixth, result F 718 has moved from fourth to fifth, result G 720 has moved from fifth to third, and result J 726 has moved from sixth to second.

Since the rankings for the top five results in current results 770 differ from the rankings for the top five results in previous results 730*b*, custom alert 750*b* is no longer null. Custom alert 750*b* contains four categories, "New Additions to Top 5" 752, "Dropped from Top 5" 756, "Rank Increased in Top 5" 760, and "Rank Decreased in Top 5" 764. Under category 752 it is shown that result J 726 has jumped to the second spot, under category 756 it is shown that result E 716 has dropped from the third spot, under category 760 it is shown that result G 720 moved from fifth to third, and under category 764 it is shown that result D 714 moved from second to fourth and result F 718 moved from fourth to fifth.

CONCLUSION

It is to be appreciated that the detailed description section, and not the summary and abstract sections, is intended to be used to interpret the claims. The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   receiving, by a system of one or more computers, a first result set produced by a first custom search engine in response to a first search query, the first result set including one or more references to web pages;
   receiving, by the system and from a first user, an alert specification, the alert specification including a search engine identifier identifying a second custom search engine, a second search query for submitting to the second custom search engine, and a previous result identifier identifying the first result set, wherein:
      the second search query differs from the first search query, or
      the second custom search engine differs from the first custom search engine;
   submitting the second search query to the second custom search engine;
   receiving a current result set from the second custom search engine in response to the second search query, the current result set including one or more references to web pages;
   identifying one or more differences between the current result set and the first result set according to a user preference specified in the alert specification;
   determining one or more alert elements based on the identified one or more differences, each alert element operable to notify the first user that at least a portion of the first result set has changed; and
   providing to the first user a customized alert according to the alert specification, the customized alert including the one or more alert elements.

2. The method of claim 1, wherein the one or more alert elements comprise:
   itemized alert content, the alert content indicating differences between the current result set and the first result set.

3. The method of claim 1, wherein the user preference specifies a type of difference to be identified between the current result set and the first result set.

4. The method of claim 1, wherein differences between the first custom search engine and the second custom search engine include changes to the first custom search engine made by a second user, the second user being in a same user group as the first user, the first custom search engine and the second search engine being specific to the user group.

5. The method of claim 1, wherein providing to the first user the customized alert comprises:
   providing to the first user the customized alert at an interval based on time and day.

6. The method of claim 1, wherein providing to the first user the customized alert comprises:
   providing to the first user the customized alert at an interval based at least in part on at least one result item in the current result set.

7. A system, comprising:
   one or more computing devices configured to perform operations comprising:
      receiving, by the system, a first result set produced by a first custom search engine in response to a first search query, the first result set including one or more references to web pages;
      receiving, by the system and from a user, an alert specification, the alert specification including a search engine identifier identifying a second custom search engine, a second search query for submitting to the second custom search engine, and a previous result identifier identifying the first result set, wherein:
         the second search query differs from the first search query, or
         the second custom search engine differs from the first custom search engine;
      submitting the second search query to the second custom search engine;
      receiving a current result from the custom search engine in response to the second search query, the current result set including one or more references to web pages;
      identifying one or more differences between the current result set and the first result set according to a user preference specified in the alert specification;
      determining one or more alert elements based on the identified one or more differences, each alert element operable to notify the user that at least a portion of the first result set has changed; and providing to the user a customized alert according to the alert specification, the customized alert including the one or more alert elements.

8. The system of claim 7, wherein providing to the user the customized alert comprises providing to the user the customized alert at an interval specified in the alert specification.

9. The system of claim 7, wherein the first result set comprises a list of result items produced by the first search query and the first custom search engine.

10. The system of claim 7, wherein the one or more alert elements comprise:

itemized alert content, the alert content indicating differences between the current result set and the first result set.

11. The system of claim 7, wherein the user preference specifies a type of difference to be identified between the current result set and the first result.

12. The system of claim 7, wherein each of the first and second custom search engines comprises:

a user-configured search engine that produces results based on a search specification and a search query, wherein the custom search engine, based on the search specification and search query, generates and outputs a modified query to a plurality of underlying search engines.

13. A non-transitory memory storing instructions operable to cause a computing device to perform operations comprising:

receiving, by a system of one or more computers, a first result set produced by a first custom search engine in response to a first search query, the first result set including one or more references to web pages;

receiving, by the system and from a user, an alert specification, the alert specification including a search engine identifier identifying a second custom search engine, a second search query for submitting to the second custom search engine, and a previous result identifier identifying the first result set, wherein:

the second search query differs from the first search query, or the second custom search engine differs from the first custom search engine;

submitting the second search query to the second custom search engine;

receiving a current result from the second custom search engine in response to the second search query, the current result set including one or more references to web pages;

identifying one or more differences between the current result set and the first result set according to a user preference specified in the alert specification;

determining one or more alert elements based on the identified one or more differences, each alert element operable to notify the user that at least a portion of the first result set has changed; and providing to the user a customized alert according to the alert specification, the customized alert including the one or more alert elements.

14. The memory of claim 13, wherein each of the first and second custom search engines comprises:

a user-configured search engine that produces results based on a search specification and a search query, wherein the custom search engine, based on the search specification and search query, generates and outputs a modified query to a plurality of underlying search engines.

15. The memory of claim 13, wherein determining the one or more alert elements comprises:

identifying at least one common result item of the current result set and the first result set; and determining the one or more alert elements based on the identified common result item.

16. The memory of claim 15, wherein determining the one or more alert elements is further based on a number of users who submitted the first search query or the second search query that produced the common result item.

17. The memory of claim 13, wherein the alert elements comprise:

itemized alert content, the alert content indicting differences between the current result set and the first result set.

18. The memory of claim 13, wherein providing to the user the customized alert according to the alert specification comprises:

providing to the user the customized alert at an interval based on time and day, the interval being specified in the alert specification.

19. The memory of claim 13, wherein providing to the user the customized alert according to the alert specification comprises:

providing to the user the customized alert according to the alert specification at an interval based on at least one result item in the current result or the first result set.

* * * * *

UNITED STATES PATENT AND TRADEMARK OFFICE
CERTIFICATE OF CORRECTION

| | |
|---|---|
| PATENT NO. | : 8,725,716 B1 |
| APPLICATION NO. | : 12/130864 |
| DATED | : May 13, 2014 |
| INVENTOR(S) | : Patrick F. Riley and Ramanathan V. Guha |

It is certified that error appears in the above-identified patent and that said Letters Patent is hereby corrected as shown below:

In the Claims

Column 13, line 19: In Claim 11, delete "first result." and insert -- first result set. --, therefor.

Column 14, line 32: In Claim 17, delete "indicting" and insert -- indicating --, therefor.

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,725,716 B1 |
| APPLICATION NO. | : 12/130864 |
| DATED | : May 13, 2014 |
| INVENTOR(S) | : Riley et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this
Twenty-eighth Day of July, 2015

Michelle K. Lee
*Director of the United States Patent and Trademark Office*